(12) United States Patent
Pellom et al.

(10) Patent No.: US 10,037,756 B2
(45) Date of Patent: Jul. 31, 2018

(54) ANALYSIS OF LONG-TERM AUDIO RECORDINGS

(71) Applicant: Sensory, Incorporated, Santa Clara, CA (US)

(72) Inventors: Bryan Pellom, Erie, CO (US); Todd F. Mozer, Los Altos Hills, CA (US)

(73) Assignee: Sensory, Incorporated, Santa Clara, CA (US)

( * ) Notice: Subject to any disclaimer, the term of this patent is extended or adjusted under 35 U.S.C. 154(b) by 0 days.

(21) Appl. No.: 15/084,070

(22) Filed: Mar. 29, 2016

(65) Prior Publication Data

US 2017/0287470 A1   Oct. 5, 2017

(51) Int. Cl.
*G10L 15/08* (2006.01)
*G10L 17/06* (2013.01)
*G06Q 30/02* (2012.01)

(52) U.S. Cl.
CPC .......... *G10L 15/08* (2013.01); *G06Q 30/0201* (2013.01); *G06Q 30/0269* (2013.01); *G10L 17/06* (2013.01); *G10L 2015/088* (2013.01)

(58) Field of Classification Search
CPC ...................................................... G10L 15/08
See application file for complete search history.

(56) References Cited

U.S. PATENT DOCUMENTS

| | | | | |
|---|---|---|---|---|
| 2004/0210443 | A1* | 10/2004 | Kuhn | G10L 15/22 704/276 |
| 2004/0249650 | A1* | 12/2004 | Freedman | G06Q 30/02 705/7.29 |
| 2010/0241963 | A1* | 9/2010 | Kulis | G06F 3/167 715/727 |
| 2011/0019805 | A1* | 1/2011 | Zoehner | G10L 15/10 379/90.01 |
| 2014/0063055 | A1* | 3/2014 | Osterhout | G06F 3/005 345/633 |
| 2014/0379484 | A1* | 12/2014 | Duponchel | G06Q 30/0269 705/14.66 |

* cited by examiner

*Primary Examiner* — Douglas Godbold
(74) *Attorney, Agent, or Firm* — Fountainhead Law Group P.C.

(57) ABSTRACT

Techniques for analyzing long-term audio recordings are provided. In one embodiment, a computing device can record audio captured from an environment of a user on a long-term basis (e.g., on the order of weeks, months, or years). The computing device can store the recorded audio on a local or remote storage device. The computing device can then analyze the recorded audio based one or more predefined rules and can enable one or more actions based on that analysis.

21 Claims, 4 Drawing Sheets

ANALYSIS OF LONG-TERM AUDIO RECORDINGS

BACKGROUND

Most electronic devices that incorporate audio recording capabilities, such as smartphones, personal computers, voice recorders, and the like, are designed to leverage audio recording for tasks that require only a relatively short amount of audio to be captured and stored at a time (e.g., on the order of seconds, minutes, or hours). For example, a smartphone may capture and store a few seconds of audio in order to interpret a voice command uttered by a user, or a voice recorder may capture and store an hour of audio in order to document what was spoken by participants in a meeting. This is because, historically, recording audio required a large amount of storage space per time unit, and thus it was not possible (or economically infeasible) to capture and store more than several hours worth of audio for extended periods of time, either locally on the device or at a remote storage location.

With recent advances in audio compression algorithms and increases in the density of storage devices, it is now possible to record audio over much longer timescales. For example, the open source Speex audio codec allows 16 kilohertz (kHz) monaural audio to be recorded at roughly 1.2 kilobytes (kB) per second, which equates to 4.2 megabytes (MB) for a full day's worth of recording, or 36 gigabytes (GB) for a full year's worth of recording. These storage sizes are quite reasonable in view of the capacities of modern storage devices. Accordingly, it would be desirable to have techniques that can leverage long-term recordings of audio data for various purposes.

SUMMARY

Techniques for analyzing long-term audio recordings are provided. In one embodiment, a computing device can record audio captured from an environment of a user on a long-term basis (e.g., on the order of weeks, months, or years). The computing device can store the recorded audio on a local or remote storage device. The computing device can then analyze the recorded audio based one or more predefined rules and can enable one or more actions based on that analysis.

A further understanding of the nature and advantages of the embodiments disclosed herein can be realized by reference to the remaining portions of the specification and the attached drawings.

DETAILED DESCRIPTION

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

The present disclosure describes techniques for recording audio in the vicinity of a user on a long-term basis (e.g., on the order of weeks, months, or years) and leveraging the recorded audio for data analytics. With these techniques, the wealth of information that is included in such long-term audio recordings (such as information regarding the user's social interactions, the user's environment, the user's condition/health, the user's preferences, and so on) can be mined to provide insights about the user during those time periods, which in turn can be used to facilitate or automate various actions or tasks (e.g., data retrieval, determination of trends, targeted advertising, etc.).

These and other aspects of the present disclosure are described in further detail in the sections that follow.

2. System Environment

Figure 1A:
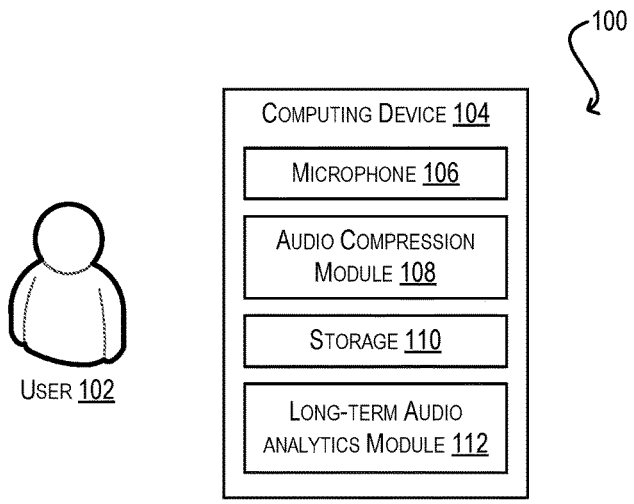
FIGS. 1A and 1B depict example system environments according to an embodiment.

FIG. 1A depicts a system environment 100 that supports the techniques of the present disclosure according to an embodiment. As shown, system environment 100 includes a user 102 and a computing device 104. Computing device 104 can be any type of electronic device that is capable of (either alone or in conjunction with other devices/systems) recording audio from user 102 and/or the user's surrounding environment. In one embodiment, computing device 104 can be a mobile device, such as a smartphone, a tablet, a smartwatch, or the like. In other embodiments, computing device 104 can be a larger device or system, such as a desktop computer, a television, a set-top box, a game console, an intelligent speaker, an in-vehicle computer system, etc.

Figure 1B:
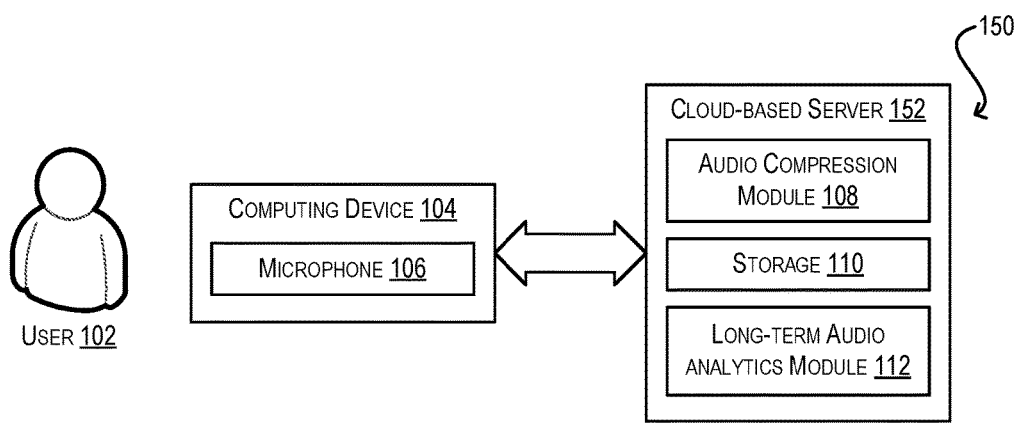

In the specific example of FIG. 1A, computing device 104 includes a microphone 106, an audio compression module 108, and a nonvolatile storage (e.g., a hard disk or flash disk) 110. In this example, computing device 104 can autonomously carry out the audio recording task by, e.g., capturing audio via microphone 106, encoding the captured audio into a compressed format using module 108, and then storing the encoded audio onto storage 110. In other embodiments, one or more of the functions attributed to components 106, 108, and/or 110 may be performed by a different device or system. For instance, FIG. 1B illustrates an alternative system environment 150 in which computing device 104 is solely responsible for capturing audio using microphone 106. Computer system 104 can then send the captured audio to a cloud-based server 152 which, upon receiving the audio, can perform the operations of encoding the audio using a server-side compression module 108 and storing the encoded audio on a server-side nonvolatile storage 110 (e.g., a cloud-based storage platform such as Amazon S3 Storage). Other system configurations are possible and are contemplated to be within the scope of the present disclosure.

As noted in the Background section, conventional use-cases for audio recording and audio analysis have generally operated on the assumption that only a relatively short amount of audio will be recorded at a time. This assumption arose out of historical limitations that made it too difficult and/or too expensive to store large amounts of captured audio, particularly if such audio needed to be stored for multiple users. However, recent advances in both audio compression and storage density have largely eliminated these limitations, making long-term audio recordings feasible.

To take advantage of this, computing device 104 of FIG. 1A (and/or cloud-based server 152 of FIG. 1B) can include a novel, long-term audio analytics module 112. Module 112 can be implemented as software that is executed by, e.g., a general-purpose processor of device 104/server 152, as a dedicated hardware component, or as a combination of software and hardware. As described in further detail below, long-term audio analytics module 112 can retrieve (from, e.g., nonvolatile storage 110) long-term audio recordings that have been captured in the environment of user 102 and can perform various analytic operations on that data, such pattern matching, sound recognition, speech recognition, speaker identification, etc. These analyses, in turn, can provide unique insights into user 102 and his/her surroundings that would be difficult to obtain otherwise, and facilitate or automate certain actions or tasks (e.g., retrieve audio of specific events that occurred in the past, collect information regarding the TV shows user 102 watches or the songs user 102 listens to, etc.). In this way, module 112 can leverage the information that is inherent in such long-term audio data.

It should be appreciated that FIGS. 1A and 1B are illustrative and not intended to limit embodiments of the present disclosure. For example, the various entities shown in FIGS. 1A and 1B may have subcomponents or functions that are not explicitly described, or may be arranged according to alternative configurations. One of ordinary skill in the art will recognize many variations, modifications, and alternatives.

3. Workflows

Figure 2:
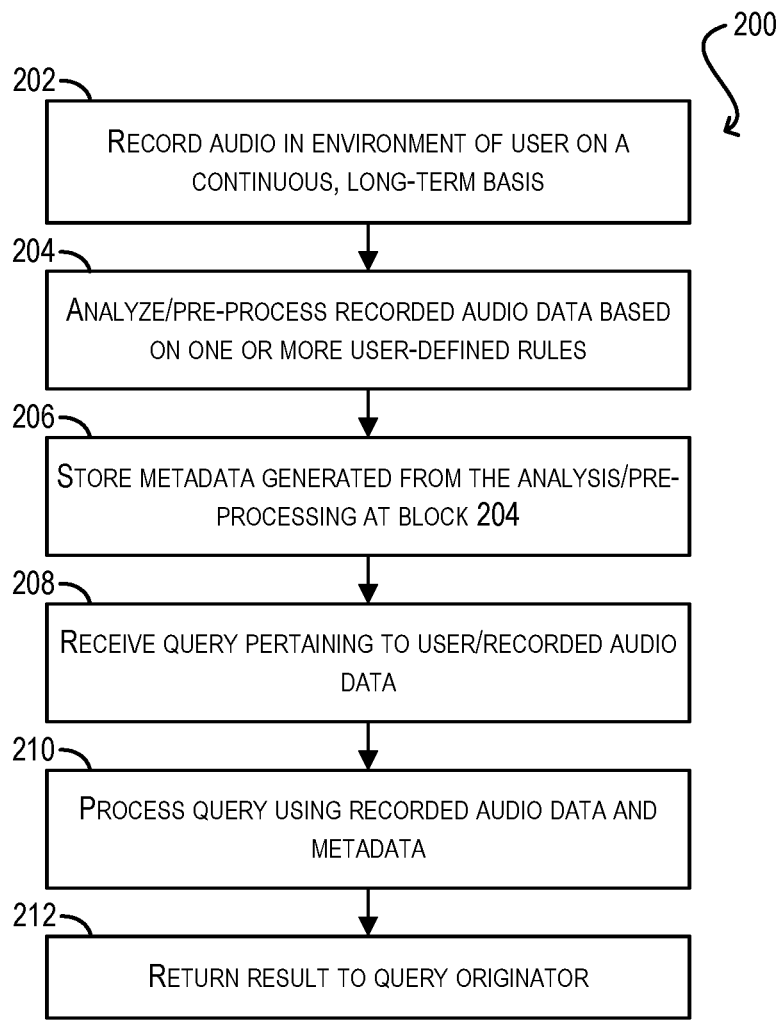
FIG. 2 depicts a first workflow for analyzing long-term audio recordings according to an embodiment.

FIG. 2 depicts a high-level workflow 200 that can be performed by computing device 104 of FIG. 1A (or cloud-based server 152 of FIG. 1B) for performing data analytics on long-term audio recordings according to an embodiment. Starting with block 202, device 104 can record audio in the environment of user 102 on a continuous, long-term basis, such as on the order of weeks, months, or years. As part of this process, device 104 can capture the audio using, e.g., microphone 106, compress the captured audio using, e.g., compression module 108, and store the compressed audio onto nonvolatile storage 110 in a streaming fashion. In embodiments where device 104 has a relatively small amount of local storage, the device can transmit the audio to a remote device/system (e.g., cloud-based server 152) for storage thereon when the device's local storage has reached capacity. Alternatively, device 104 can be configured to store the entirety of the recording on the remote device/system.

At block 204, long-term audio analytics module 112 can analyze/pre-process the recorded audio data based on one or more user-defined rules (block 204). The specific nature of this analysis/pre-processing can vary based on the desired purposes of recording the audio data. For instance, in one set of embodiments, the analysis/pre-processing can involve:

Detecting certain sounds of interest, such as laughter (for revisiting "special" moments in the past), coughing or snoring (for tracking the user's health), TV/media (for monitoring user 102's media consumption habits and preferences), explosions/glass breaking/gunshots (for security monitoring), etc.;
identifying known or unknown speakers;
tagging portions of the audio with GPS location to indicate where those portions were captured (using, e.g., a GPS system integrated into device 104);
tagging portions of the audio with other information known to device 104, such as calendar events;
detecting certain keywords of interest, such as a specific person's name or "help!"; and/or
transcribing recognized speech.

It should be appreciated that this list is not exhaustive and various other types of analyses and pre-processing will be apparent to one of ordinary skill in the art.

At block 206, long-term audio analytics module 112 can store metadata generated from the analysis/pre-processing performed at block 204. Examples of such metadata can include detected sounds/keywords and the times at which they occurred, the identities of detected speakers, and so on. In one embodiment, this metadata can be embedded in the recorded audio data. In other embodiments, this metadata can be stored in a separate location or file that is associated with the recorded audio data.

Then, at blocks 208 and 210, long-term audio analytics module 112 can receive a query regarding the recorded audio data and can process the query using the recorded audio data and the metadata stored at block 206. These queries can relate to user 102's condition, preferences, environment, etc. over the time period during which the audio was recorded, and can include, e.g.:

How much TV does user 102 watch per day?
Has user 102 been coughing? Has the frequency of coughing increased or decreased over the last X days?
Has user 102 been snoring at night?
How many people does user 102 talk to per day?
What are user 102's most listened-to songs?
When was the last time someone mentioned "Y"?
When was the last time user 102 spoke to Z?
What did Z ask user 102 to buy last week?

Finally, at block 212, long-term audio analytics module 112 can provide a query result (i.e., answer) to the query originator and the workflow can return to block 208 so that module 112 can receive and process additional queries.

It should be appreciated that workflow 200 is illustrative and various modifications are possible. For example, while workflow 200 is shown as being performed in a serial fashion, in various embodiments some portions of this workflow may be performed concurrently or in parallel with others. For instance, the analysis/pre-processing of the recorded audio data at block 204 can be performed in parallel with the audio recording performed at block 202, such that the audio data is analyzed in a continuous manner as it is being recorded. Further, the query processing performed at blocks 208-212 can also be performed in parallel with blocks 204 and/or 202.

As another example, although workflow 200 specifically describes a use-case where long-term audio analytics module 112 is configured to process queries based on its analysis of long-term audio data, in alternative embodiments module 112 can also autonomously perform other actions or tasks based on its analysis/pre-processing. Examples of such actions/tasks include, e.g., automatically updating a health or preference profile for user 102, updating user 102's calendar or task list to indicate certain tasks or meetings have been completed, updating a security monitoring profile for user 102's home, and so on. This updated information can then be leveraged for various purposes, such as targeting certain types of advertisements to user 102. One of ordinary skill in the art will recognize other variations, modifications, and alternatives.

Figure 3:
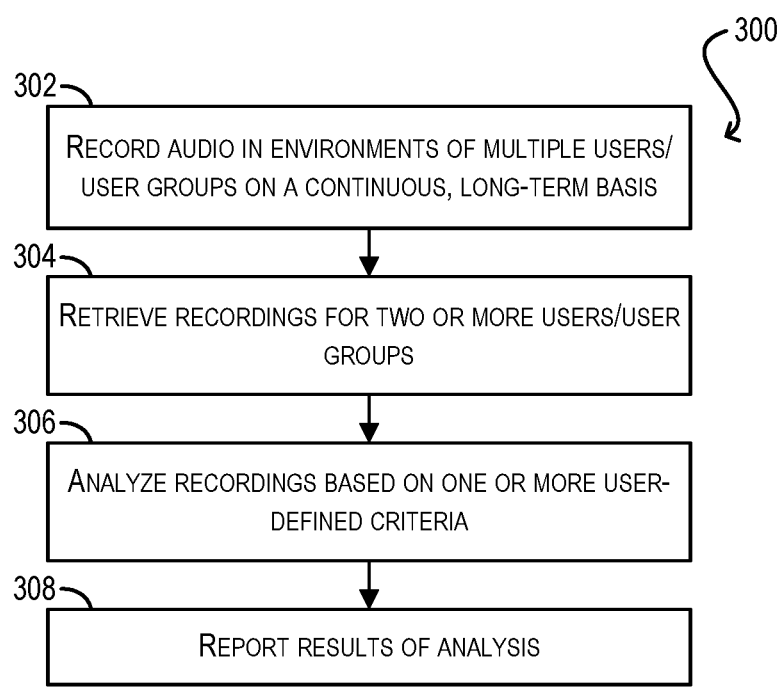
FIG. 3 depicts a second workflow for analyzing long-term audio recordings according to an embodiment.

In some embodiments, in addition to performing analysis of long-term audio data that is recorded with respect to a particular user 102, module 112 can also perform data analytics on long-term audio that is captured across users or user groups (e.g., households). FIG. 3 depicts a workflow 300 of such a process according to an embodiment.

Starting with block 302, audio can be recorded in the environments of multiple users or user groups on a continuous, long-term basis. Each of these recordings can stored and associated with an identifier of the user or user group.

At blocks 304 and 306, long-term audio analytics module 112 can retrieve the recordings for two or more of the users/user groups and can analyze/compare the recordings based on one or more user-defined criteria. These criteria can be designed to provide insights into differences or commonalities between the users/user groups and their respective recordings, such as whether there is any correlation between households with children and the occurrence of broken glass, any correlation between loud TV/music listening and snoring, and so on.

Finally, at block 308, module 112 can report the results of its analysis to an interested entity (e.g., a user, research organization, etc.).

4. Example Computing Device

Figure 4:
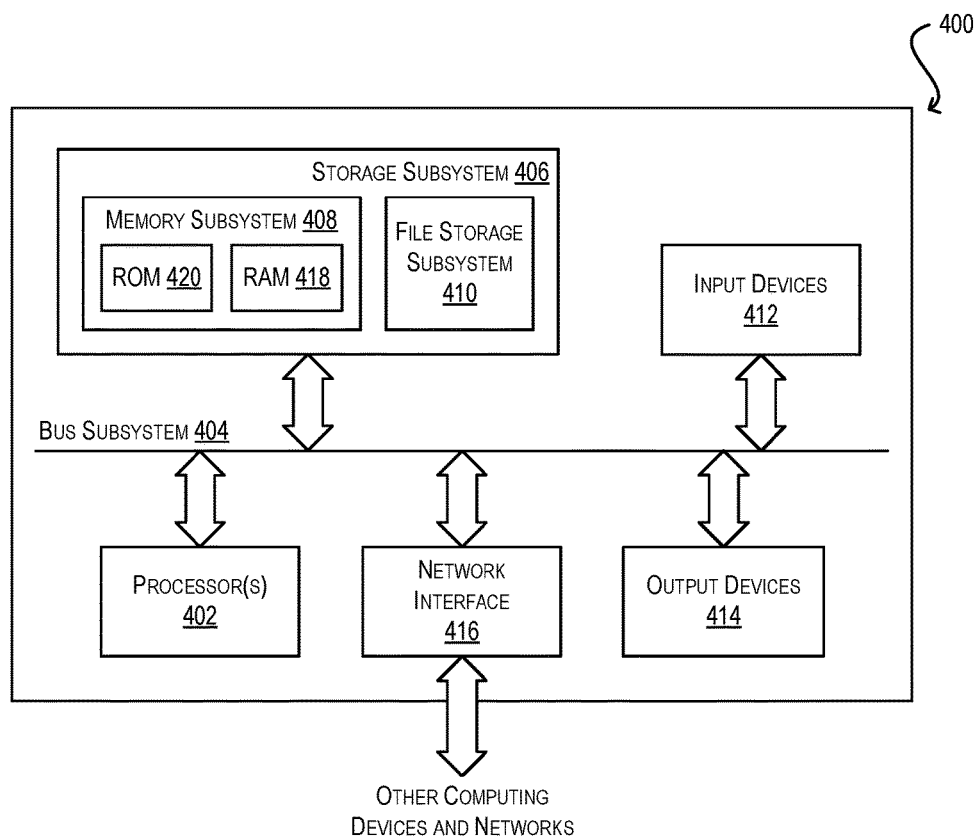
FIG. 4 depicts a computing device according to an embodiment.

FIG. 4 is a simplified block diagram of a computing device 400 that may be used to implement device 104 or server 152 of the foregoing disclosure. As shown, computing device 400 includes one or more processors 402 that communicate with a number of peripheral devices via a bus subsystem 404. These peripheral devices include a storage subsystem 406 (comprising a memory subsystem 408 and a file storage subsystem 410), input devices 412, output devices 414, and a network interface subsystem 416.

Bus subsystem 404 can provide a mechanism for letting the various components and subsystems of computing device 400 communicate with each other as intended. Although bus subsystem 404 is shown schematically as a single bus, alternative embodiments of the bus subsystem can utilize multiple buses.

Network interface subsystem 416 can serve as an interface for communicating data between computing device 400 and other computing devices or networks. Embodiments of network interface subsystem 416 can include wired (e.g., coaxial, twisted pair, or fiber optic Ethernet) and/or wireless (e.g., Wi-Fi, cellular, Bluetooth, etc.) interfaces.

Input devices 412 can include a camera, a touch-screen incorporated into a display, a keyboard, a pointing device (e.g., mouse, touchpad, etc.), an audio input device (e.g., such as microphone 106 of FIGS. 1A/1B), and/or other types of input devices. In general, use of the term "input device" is intended to include all possible types of devices and mechanisms for inputting information into computing device 400.

Output devices 414 can include a display subsystem (e.g., a flat-panel display), an audio output device (e.g., a speaker), and/or the like. In general, use of the term "output device" is intended to include all possible types of devices and mechanisms for outputting information from computing device 400.

Storage subsystem 406 includes a memory subsystem 408 and a file/disk storage subsystem 410. Subsystems 408 and 410 represent non-transitory computer-readable storage media that can store program code and/or data that provide the functionality of various embodiments described herein.

Memory subsystem 408 can include a number of memories including a main random access memory (RAM) 418 for storage of instructions and data during program execution and a read-only memory (ROM) 420 in which fixed instructions are stored. File storage subsystem 410 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device 400 is illustrative and not intended to limit embodiments of the present invention. Many other configurations having more or fewer components than computing device 400 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    recording, by a computing device, audio captured from an environment of a user over a continuous period of time spanning one or more weeks, months, or years;
    storing the recorded audio on a local or remote storage device;
    analyzing the recorded audio based on one or more predefined rules; and
    enabling one or more actions based on the analyzing of the recorded audio, wherein the one or more actions include:
        receiving first and second queries, the first query requesting information regarding a health condition of the user during the continuous period of time, the second query requesting information regarding leisure activities performed by the user within the environment during the continuous period of time, the health condition and the leisure activities being discernable via audible cues captured in the recorded audio;
        processing the first and second queries based on the recorded audio and metadata generated from the analyzing; and
        returning results for the first and second queries.

2. The method of claim 1 wherein analyzing the recorded audio comprises one or more of:
    detecting one or more sounds of interest and identifying times in the recorded audio at which the sounds are detected;
    identifying known or unknown speakers;
    tagging portions of the audio with a GPS location;
    tagging portions of the audio with calendar events of the user that are known to the computing device;

detecting one or more keywords of interest and identifying times in the recorded audio at which the sounds are detected; or transcribing recognized speech.

3. The method of claim 1 wherein the one or more actions further include:

receiving a third query requesting information regarding interactions between the user and one or more other individuals within the environment during the continuous period of time, the interactions being discernable via the audible cues captured in the recorded audio;

processing the third query based on the recorded audio and the metadata generated from the analyzing; and returning a result for the third query.

4. The method of claim 1 wherein the one or more actions further include:

automatically updating a profile associated with the user.

5. The method of claim 4 where the updated profile is used to target one or more advertisements to the user.

6. The method of claim 1 further comprising:

recording audio captured from an environment of one or more other users or user groups on a continuous, long-term basis; and comparing the recorded audio for the various users or user groups based on one or more predefined criteria.

7. A non-transitory computer readable medium having stored thereon program code executable by a processor of a computing device, the program code comprising code that causes the processor to:

record audio captured from an environment of a user over a continuous period of time spanning one or more weeks, months, or years;

store the recorded audio on a local or remote storage device;

analyze the recorded audio based on one or more predefined rules; and enable one or more actions based on the analyzing of the recorded audio, wherein the one or more actions include:

receiving first and second queries, the first query requesting information regarding a health condition of the user during the continuous period of time, the second query requesting information regarding leisure activities performed by the user within the environment during the continuous period of time, the health condition and the leisure activities being discernable via audible cues captured in the recorded audio;

processing the first and second queries based on the recorded audio and metadata generated from the analyzing; and returning results for the first and second queries.

8. The non-transitory computer readable medium of claim 7 wherein the code that causes the processor to analyze the recorded audio comprises code that causes the processor to:

detect one or more sounds of interest and identifying times in the recorded audio at which the sounds are detected;

identify known or unknown speakers;

tag portions of the audio with a GPS location;

tag portions of the audio with calendar events of the user that are known to the computing device;

detect one or more keywords of interest and identifying times in the recorded audio at which the sounds are detected; or transcribe recognized speech.

9. The non-transitory computer readable medium of claim 7 wherein the one or more actions further include:

receiving a third query requesting information regarding interactions between the user and one or more other individuals within the environment during the continuous period of time, the interactions being discernable via the audible cues captured in the recorded audio;

processing the third query based on the recorded audio and the metadata generated from the analyzing; and returning a result for the third query.

10. The non-transitory computer readable medium of claim 7 wherein the one or more actions further include:

automatically update a profile associated with the user.

11. The non-transitory computer readable medium of claim 10 where the updated profile is used to target one or more advertisements to the user.

12. The non-transitory computer readable medium of claim 7 wherein the program code further comprises code that causes the processor to:

record audio captured from an environment of one or more other users or user groups on a continuous, long-term basis; and compare the recorded audio for the various users or user groups based on one or more predefined criteria.

13. A computing device comprising:

a microphone; and a processor configured to:

record audio captured via the microphone from an environment of a user over a continuous period of time spanning one or more weeks, months, or years;

store the recorded audio on a local or remote storage device;

analyze the recorded audio based on one or more predefined rules; and enable one or more actions based on the analyzing of the recorded audio, wherein the one or more actions include:

receiving first and second queries, the first query requesting information regarding a health condition of the user during the continuous period of time, the second query requesting information regarding leisure activities performed by the user within the environment during the continuous period of time, the health condition and the leisure activities being discernable via audible cues captured in the recorded audio;

processing the first and second queries based on the recorded audio and metadata generated from the analyzing; and returning results for the first and second queries.

14. The computing device of claim 13 wherein analyzing the recorded audio comprises one or more of:

detecting one or more sounds of interest and identifying times in the recorded audio at which the sounds are detected;

identifying known or unknown speakers;

tagging portions of the audio with a GPS location;

tagging portions of the audio with calendar events of the user that are known to the computing device;

detecting one or more keywords of interest and identifying times in the recorded audio at which the sounds are detected; or transcribing recognized speech.

15. The computing device of claim 13 wherein the one or more actions further include:

receiving a third query requesting information regarding interactions between the user and one or more other individuals within the environment during the continuous period of time, the interactions being discernable via the audible cues captured in the recorded audio;

processing the third query based on the recorded audio and the metadata generated from the analyzing; and returning a result for the third query.

16. The computing device of claim 13 wherein the one or more actions further include:

automatically updating a profile associated with the user.

17. The computing device of claim 16 where the updated profile is used to target one or more advertisements to the user.

18. The computing device of claim 13 wherein the processor is further configured to:

record audio captured from an environment of one or more other users or user groups on a continuous, long-term basis; and compare the recorded audio for the various users or user groups based on one or more predefined criteria.

19. The method of claim 1 wherein the first is a query pertaining to coughing or snoring performed by the user during the continuous time period.

20. The method of claim 1 wherein the second query is a query pertaining to television watching or music listening performed by the user during the continuous time period.

21. The method of claim 3 wherein the third query is a query pertaining to a conversation held between the user and another individual during the continuous time period.

* * * * *